United States Patent
Li

(10) Patent No.: US 12,498,824 B2
(45) Date of Patent: Dec. 16, 2025

(54) DRIVING CIRCUIT OF DISPLAY PANEL AND RELATED DISPLAY DEVICE

(71) Applicant: GUANGZHOU CHINA STAR OPTOELECTRONICS SEMICONDUCTOR DISPLAY TECHNOLOGY CO., LTD., Guangdong (CN)

(72) Inventor: Binbin Li, Guangdong (CN)

(73) Assignee: GUANGZHOU CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/400,439

(22) Filed: Dec. 29, 2023

(65) Prior Publication Data

US 2025/0190075 A1     Jun. 12, 2025

(30) Foreign Application Priority Data

Dec. 12, 2023 (CN) .......................... 202311705852.6

(51) Int. Cl.
*G06F 3/041*     (2006.01)
*G09G 3/00*     (2006.01)

(52) U.S. Cl.
CPC ......... *G06F 3/04184* (2019.05); *G09G 3/006* (2013.01); *G09G 2320/0209* (2013.01); *G09G 2354/00* (2013.01)

(58) Field of Classification Search
CPC ................ G06F 3/04184; G09G 3/006; G09G 2320/0209; G09G 2354/00
See application file for complete search history.

(56) References Cited

U.S. PATENT DOCUMENTS

| | | | |
|---|---|---|---|
| 9,223,425 B1* | 12/2015 | Kim ..................... | G06F 3/04166 |
| 9,323,374 B2* | 4/2016 | Noguchi ............... | G06F 3/0445 |
| 10,613,660 B2* | 4/2020 | Kang ................. | G02F 1/136209 |

* cited by examiner

*Primary Examiner* — Koosha Sharifi-Tafreshi
(74) *Attorney, Agent, or Firm* — HSML P.C.

(57) ABSTRACT

A driving circuit of a display panel is provided. The display panel includes sensing electrodes. The driving circuit includes a first control unit and a compensation control unit. The first control unit outputs a common voltage or a modulation voltage to the sensing electrodes. The compensation control unit is electrically connected to an input signal line and the first control unit. In a display stage, the compensation control unit generates a first voltage signal according to a feedback signal and an input signal transmitted by the input signal line, and the first control unit outputs the common voltage according to the first voltage signal. In a sensing stage, the compensation control unit generates a second voltage signal according to the input signal, and the first control unit outputs the modulation voltage according to the second voltage signal.

15 Claims, 6 Drawing Sheets

DRIVING CIRCUIT OF DISPLAY PANEL AND RELATED DISPLAY DEVICE

CROSS REFERENCE TO RELATED APPLICATION

This application claims the priority of Chinese Patent Application No. 202311705852.6, entitled "DRIVING CIRCUIT OF DISPLAY PANEL AND RELATED DISPLAY DEVICE", filed on Dec. 12, 2023, the disclosure of which is incorporated herein by reference in its entirety.

FIELD OF THE DISCLOSURE

The present disclosure relates to a display technology, and more particularly, to a driving circuit of a display panel and a related display device.

BACKGROUND

When the display panel is being displayed, changes in the data signal are coupled to the common voltage through the parasitic capacitor. This results in abnormal displays. When the display panel samples an inline touch design, the common electrodes are split into multiple regions to implement the touch sensing design. However, this design results in horizontal stripes on the display panel.

SUMMARY

One objective of an embodiment of the present disclosure is to provide a driving circuit of a display panel and a related display device to improve the effect of horizontal stripes.

According to an embodiment of the present disclosure, a driving circuit of a display panel is disclosed. The display panel comprises a plurality of sensing electrodes. The driving circuit comprises: a first control unit, electrically connected to the plurality of sensing electrodes, configured to output a common voltage or a modulation voltage to the plurality of sensing electrodes; a compensation control unit, electrically connected to an input signal line and the first control unit. In a display stage of the display panel, the compensation control unit is configured to generate a first voltage signal according to a feedback signal and an input signal transmitted by the input signal line, and the first control unit is configured to output the common voltage according to the first voltage signal. In a sensing stage of the display panel, the compensation control unit is configured to generate a second voltage signal according to the input signal, and the first control unit is configured to output the modulation voltage according to the second voltage signal.

Optionally, the compensation control unit comprises a second control unit configured to generate at least one switching control signal, a feedback unit configured to generate the feedback signal according to a coupling change of the common voltage of the plurality of sensing electrodes, a voltage selection unit electrically connecting the input signal line, the first control unit and the second control unit, and a compensation unit electrically connected to the feedback unit and the voltage selection unit. In the display stage, the voltage selection unit is configured to control the compensation unit according to the corresponding switching control signal to generate the first voltage signal according to the input signal and the feedback signal to output the first voltage signal to the first control unit. In the sensing stage, the voltage selection unit is configured to generate the second voltage signal according to the corresponding switching control signal and the input signal to output the second voltage signal to the first control unit.

Optionally, the voltage selection unit comprises a first input control module, a second input control module, and an output control module. The first input control module is electrically connected between the second control unit and the compensation unit, and is configured to electrically connect the input signal line and the compensation unit according to the corresponding switching control signal. The second input control module is electrically connected between the second control unit and the first control unit, and is configured to electrically connect the input signal line and the first control unit according to the corresponding switching control signal. The output control module is electrically connected to the first control unit, the compensation unit and the second control unit, and is configured to electrically connect an output terminal of the compensation unit and the first control unit according to the corresponding switching control signal when the input signal line and a first input terminal of the compensation unit are electrically connected.

Optionally, the switching control signal comprises a first switching control signal, a second switching control signal and a third switching control signal. The first input control module comprises a first transistor, a control terminal of the first transistor is configured to receive the first switching control signal, an input terminal of the first transistor is electrically connected to the input signal line, and an output terminal of the first transistor is electrically connected with the compensation unit. The second input control module comprises a second transistor, a control terminal of the second transistor is configured to receive the second switching control signal, an input terminal of the second transistor is electrically connected with the input signal line, and an output terminal of the second transistor is electrically connected with the first control unit. The output control module comprises a third transistor, a control terminal of the third transistor is configured to receive the third switching control signal, an input terminal of the third transistor is electrically connected with the output terminal of the compensation unit, and an output terminal of the third transistor is electrically connected with the first control unit.

Optionally, the first switching control signal is identical to the second switching control signal, the first switching control signal is identical to the third switching control signal are identical, the first transistor and the third transistor are one of a P-type transistor and an N-type transistor, and the second transistor is the other of the P-type transistors and the N-type transistor.

Optionally, the driving circuit further comprises a first resistor. A first terminal of the first resistor is electrically connected with the output terminal of the second transistor and the output terminal of the third transistor, and a second terminal of the first resistor is electrically connected to the first control unit.

Optionally, the compensation unit comprises an operating circuit, having a non-inverting input terminal electrically connected to the output terminal of the first transistor; an inverting input terminal electrically connected to the input terminal of the third transistor and configured to receive the feedback signal, and an output terminal electrically connected to the inverting input terminal. The second resistor is electrically connected between the inverting input terminal and the output terminal of the operating circuit.

Optionally, the input signal is a DC signal in the display stage; and the input signal is an alternating current signal in the sensing stage.

According to an embodiment of the present disclosure, a display device is disclosed. The display device comprises the above-mentioned driving circuit and a display panel, comprising a plurality of sensing electrodes, a common wiring switching unit; wherein the sensing electrodes are electrically connected to the first control unit, and the switching unit is electrically connected to the plurality of sensing electrodes, the common wiring and the second control unit. In the display stage, the switching unit is configured to electrically connect the plurality of sensing electrodes and the common wiring according to the corresponding switching control signal. In the sensing stage, the switching unit is configured to break the electrical connection between the plurality of sensing electrodes and the common wiring according to the corresponding switching control signal.

Optionally, the switching unit comprises a plurality of switching transistors. An input terminal of each switching transistor is electrically connected to the common wiring, an output terminal of each switching transistor is electrically connected to a corresponding sensing electrode, and a control terminal of each switching transistor is electrically connected to the second control unit. The control terminals of the plurality of switching transistors are configured to receive the switching control signal.

Optionally, the compensation control unit comprises a second control unit configured to generate at least one switching control signal, a feedback unit configured to generate the feedback signal according to a coupling change of the common voltage of the plurality of sensing electrodes, a voltage selection unit electrically connecting the input signal line, the first control unit and the second control unit, and a compensation unit electrically connected to the feedback unit and the voltage selection unit. In the display stage, the voltage selection unit is configured to control the compensation unit according to the corresponding switching control signal to generate the first voltage signal according to the input signal and the feedback signal to output the first voltage signal to the first control unit. In the sensing stage, the voltage selection unit is configured to generate the second voltage signal according to the corresponding switching control signal and the input signal to output the second voltage signal to the first control unit.

Optionally, the voltage selection unit comprises a first input control module, a second input control module, and an output control module. The first input control module is electrically connected between the second control unit and the compensation unit, and is configured to electrically connect the input signal line and the compensation unit according to the corresponding switching control signal. The second input control module is electrically connected between the second control unit and the first control unit, and is configured to electrically connect the input signal line and the first control unit according to the corresponding switching control signal. The output control module is electrically connected to the first control unit, the compensation unit and the second control unit, and is configured to electrically connect an output terminal of the compensation unit and the first control unit according to the corresponding switching control signal when the input signal line and a first input terminal of the compensation unit are electrically connected.

Optionally, the switching control signal comprises a first switching control signal, a second switching control signal and a third switching control signal. The first input control module comprises a first transistor, a control terminal of the first transistor is configured to receive the first switching control signal, an input terminal of the first transistor is electrically connected to the input signal line, and an output terminal of the first transistor is electrically connected with the compensation unit. The second input control module comprises a second transistor, a control terminal of the second transistor is configured to receive the second switching control signal, an input terminal of the second transistor is electrically connected with the input signal line, and an output terminal of the second transistor is electrically connected with the first control unit. The output control module comprises a third transistor, a control terminal of the third transistor is configured to receive the third switching control signal, an input terminal of the third transistor is electrically connected with the output terminal of the compensation unit, and an output terminal of the third transistor is electrically connected with the first control unit.

Optionally, the first switching control signal is identical to the second switching control signal, the first switching control signal is identical to the third switching control signal are identical, the first transistor and the third transistor are one of a P-type transistor and an N-type transistor, and the second transistor is the other of the P-type transistors and the N-type transistor.

Optionally, the driving circuit further comprises a first resistor. A first terminal of the first resistor is electrically connected with the output terminal of the second transistor and the output terminal of the third transistor, and a second terminal of the first resistor is electrically connected to the first control unit.

Optionally, the compensation unit comprises an operating circuit, having a non-inverting input terminal electrically connected to the output terminal of the first transistor; an inverting input terminal electrically connected to the input terminal of the third transistor and configured to receive the feedback signal, and an output terminal electrically connected to the inverting input terminal. The second resistor is electrically connected between the inverting input terminal and the output terminal of the operating circuit.

Optionally, the input signal is a DC signal in the display stage; and the input signal is an alternating current signal in the sensing stage.

The present disclosure discloses a driving circuit for a display panel and a related display device. The display panel comprises a plurality of sensing electrodes, and the driving circuit comprises a first control unit and a compensation control unit. The plurality of sensing electrodes receive a common voltage output by the first control unit during the display stage of the display panel, and the plurality of sensing electrodes receive the modulation voltage output by the first control unit during the sensing stage of the display panel. In the display stage of the display panel, the compensation control unit generates the first voltage signal according to the feedback signal and the input signal, so that the first control unit operates differently according to the common voltage output of the first voltage signal corresponding to different coupling information, so that the coupling influence of the common voltage is compensated in the display stage. This could improve the issue of horizontal stripes on the display panel. In the sensing stage of the display panel, the compensation control unit generates a second voltage signal according to the input signal, so that the first control unit outputs the modulated voltage to the plurality of sensing electrodes according to the second voltage signal, so that the display panel can perform the sensing function.

BRIEF DESCRIPTION OF THE DRAWINGS

In order to more clearly illustrate the technical solution in the embodiment of the present disclosure, the following will be a brief introduction to the drawings required in the description of the embodiment. Obviously, the drawings described below are only some embodiments of the present disclosure, for those skilled in the art, without the premise of creative labor, may also obtain other drawings according to these drawings.

DETAILED DESCRIPTION OF PREFERRED EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

The following disclosure provides many different embodiments or examples to implement different structures of the present disclosure. In order to simplify the disclosure of the present disclosure, the components and settings of specific examples are described below. They are for example purposes only and are not intended to limit this application. Further, the present disclosure may repeat reference numbers and/or reference letters in different examples, such duplication is for the purpose of simplification and clarity, and does not by itself indicate the relationship between the various embodiments and/or settings discussed. Further, the present disclosure provides various examples of specific processes and materials, but those of ordinary skill in the art may be aware of the application of other processes and/or the use of other materials. The following are described in detail, it should be noted that the order of description of the following embodiments is not used as a qualification for the preferred order of embodiments.

Further, the terms "first", "second" are for descriptive purposes only, and cannot be understood as indicating or implying relative importance or implicitly indicating the number of technical features indicated, thereby limiting the features of "first", "second" may explicitly or implicitly include one or more of the features, in the description of the present invention, "plurality" means two or more, unless otherwise expressly and specifically limited.

Figure 1A:
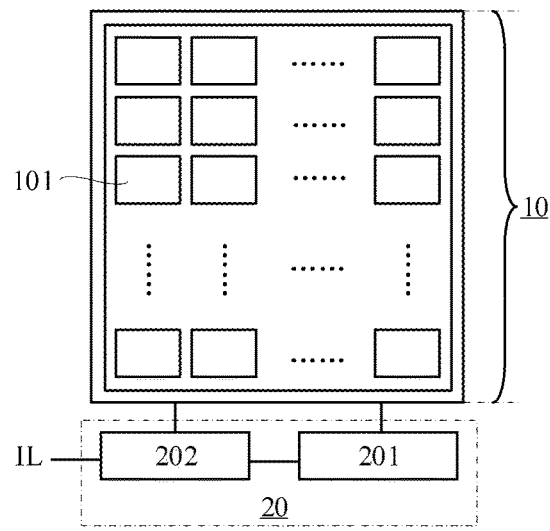
FIGS. 1A-1B are functional block diagrams of a driving circuit of a display panel according to an embodiment of the present disclosure.
Figure 1B:
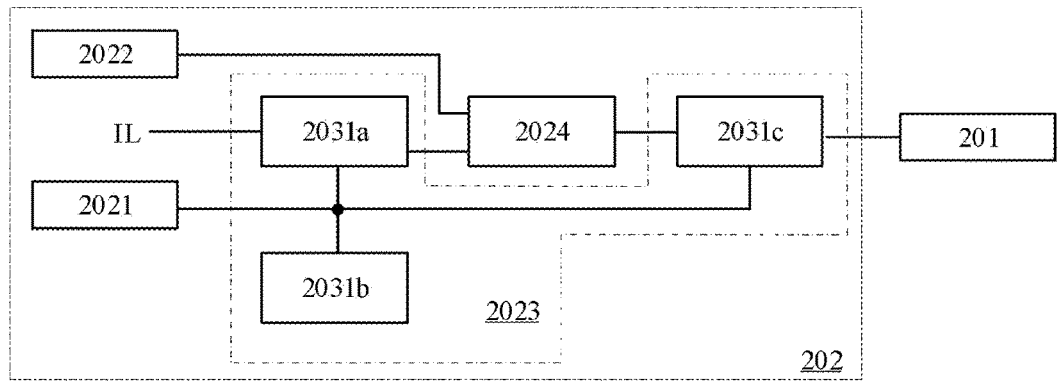

FIGS. 1A-1B are functional block diagrams of a driving circuit of a display panel according to an embodiment of the present disclosure. The present disclosure provides a driving circuit of the display panel and a display device.

The driving circuit 20 comprises a first control unit 201 and a compensation control unit 202.

The display panel 10 comprises a plurality of sensing electrodes. The first control unit 201 is electrically connected to the plurality of sensing electrodes 101. The first control unit 201 is configured to output a common voltage or a modulation voltage to the plurality of sensing electrodes 101.

Optionally, the plurality of sensing electrodes 101 can be used to implement the display function and the sensing function (such as touch function) of the display panel 10. In the display stage of the display panel 10, the sensing electrodes 101 receive the common voltage. In the sensing stage of the display panel 10, the sensing electrodes 101 receive the modulation voltage. Optionally, in the sensing stage, the sensing electrodes 101 may be used as a transmitting electrode or a receiving electrode.

Optionally, the sensing electrodes 101 are configured for the touch function of the display panel 10. In the sensing stage, the input object (such as a stylus, a finger, etc.) is close to the sensing electrodes 101 and changes the electric field between the sensing electrodes 101. Thus, the capacitive coupling between the sensing electrodes 101 changes. By utilizing devices such as the first control unit 201 or a controller to obtain the variance of the capacitive coupling, the touch position can be obtained such that the touch function of the display panel 10 can be implemented. Optionally, the transmitting electrode can be modulated relative to a reference voltage (e.g., systematically) to deliver the modulation voltage. The receiving electrode can be kept constant with respect to the reference voltage to facilitate the reception of the measurement signal. The measurement signal can include an influence corresponding to one or more modulation voltages, and the measurement signal can be used to determine the measurement of the capacitive coupling at the pixel.

Optionally, the first control unit 201 is configured to use the modulation voltage to drive a plurality of sensing electrodes 101 row by row and generate information related to the position of the input object according to a measurement signal corresponding to the influence of the modulation voltage.

Optionally, the first control unit 201 is configured to drive a plurality of sensing electrodes 101 with the modulating voltage and determines the position of the input object according to a measurement signal containing an influence corresponding to the modulation voltage.

Optionally, a plurality of sensing electrodes 101 are used as transmitting electrodes and a plurality of sensing electrodes 101 are used as receiving electrodes. The first control unit 201 is configured to use the modulation voltage to drive the transmitting electrodes. The receiving electrodes are used to receive a measurement signal corresponding to the influence of the modulating voltage to determine the position of the input object.

Optionally, the first control unit 201 comprises devices, such as a touch driver chip or a source driver chip.

Optionally, the first control unit 201 can be arranged on a display panel 10 with a Chip On Glass (COG).

In the display stage of the display panel 10, the compensation control unit 202 is configured to generate a first voltage signal according to the feedback signal V_F and input signal V_in transmitted by the input signal line IL. The first control unit 201 is configured to output the common voltage according to V_in the first voltage signal. By using the compensation control unit 202 to generate the first voltage signal based on the feedback signal V_F containing the common voltage coupling information, the first voltage signal can be different according to different coupling information, so that the common voltage output by the first control unit 201 is also different according to different coupling information. In this way, when the scan signals and/or the data signals change, the influence of the common voltage that changes through the coupling of parasitic capacitance can be compensated. Thus, the issue of horizontal stripes of the display panel 10 can be improved.

The horizontal stripes appear on the display panel because the change of the data signal before and after the sensing operation is coupled to the common voltage. The touch operation corresponds to the sensing stage. The display stage is before or after the sensing stage. The feedback signal V_F can represent the coupling change of the common voltage of the multiple sensing electrodes 101.

In the sensing stage of the display panel 10, the compensation control unit 202 is configured to generate a second voltage signal according to the input signal V_in, and the first control unit 201 is configured to output the modulation voltage to the plurality of sensing electrodes 101 according to the second voltage signal, so that the sensing function of the display panel 10 could be implemented.

Optionally, the input signal V_in can be generated by the power management chip, and the power management chip is electrically connected to the compensation control unit 202 through the input signal line IL.

Optionally, in the display stage of the display panel 10, the first voltage signal can be output to the plurality of sensing electrodes 101 by the first control unit 201 as a common voltage. In the sensing stage of the display panel 10, the second voltage signal can be output to the plurality of sensing electrodes 101 by the first control unit 201 as a modulation voltage.

Optionally, in the display stage of display panel 10, the input signal V_in is the initial common voltage. In the display stage of the display panel 10, when the first voltage signal is output to a plurality of sensing electrodes 101 by the first control unit 201 as a common voltage, the first voltage signal is a compensated common voltage.

Please refer to FIGS. 1A-1B. The compensation control unit 202 comprises a second control unit 2021, a feedback unit 2022, a voltage selection unit 2023 and a compensation unit 2024.

The second control unit 2021 is configured to generate at least one switching control signal SC.

The feedback unit 2022 is configured to generate a feedback signal V_F based on the coupling change of the common voltage of the sensing electrodes 101.

The voltage selection unit 2023 is electrically connected to the input signal line IL, the first control unit 201 and the second control unit 2021.

The compensation unit 2024 is electrically connected to the feedback unit 2022 and the voltage selection unit 2023.

In the display stage, the voltage selection unit 2023 is configured to control the compensation unit 2024 according to the corresponding switching control signal SC to generate a first voltage signal to generate a first voltage signal according to the input signal V_in and feedback signal V_F to output the first voltage signal to the first control unit 201. In the sensing stage, the voltage selection unit 2023 is configured to generate a second voltage signal according to the input signal V_in and the corresponding switching control signal SC and output the second voltage signal to the first control unit 201.

By including the voltage selection unit 2023, the voltage selection unit 2023 selects the compensation unit 2024 to output the first voltage signal V_in according to the feedback signal V_F and the input signal, thereby improving the coupling issue of the common voltage through the compensation unit 2024 and the first control unit 201. By including the voltage selection unit 2023, the voltage selection unit 2023 could control the compensation control unit 202 not to output the first voltage signal to the first control unit 201 during the sensing stage, but to generate the second voltage signal according to the input signal V_in to output the second voltage signal to the first control unit 201, thereby providing the required modulation voltage for the sensing electrodes 101 through the second control unit 2021 of the compensation control unit 202 and the input signal V_in so that the sensing function of the display panel 10 can be implemented.

Optionally, the second control unit 2021 comprises a timing controller. The feedback unit 2022 can adopt a conventional structure. The feedback unit 2022 provides real-time feedback on the coupling condition of the common voltage.

Figure 2:
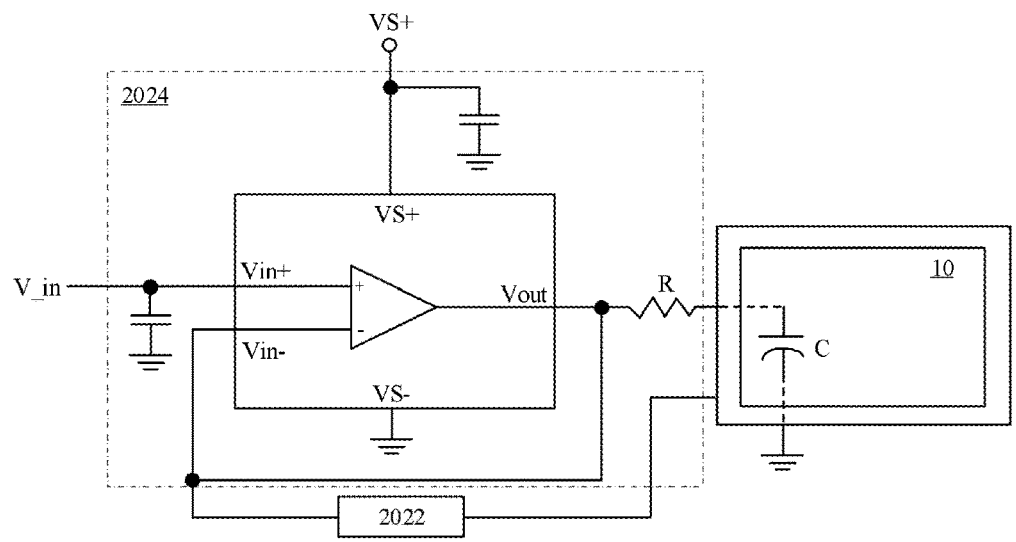
FIG. 2 is a diagram of a compensation unit according to an embodiment of the present disclosure.

FIG. 2 is a diagram of a compensation unit according to an embodiment of the present disclosure. VS+ and VS− represent the power supply of the represents, Vin+ and Vin− represent the input of the operating circuit, Vout represents the output of the operating circuit, R represents the resistor, and C represents the capacitor in the display panel. The signal received by power supply VS+ of the operating circuit can be provided by a power driver chip.

Here, the compensation unit 2024 is used in the display panel 10 that cannot realize the sensing function. The coupling influence on the common voltage is compensated through the compensation unit 2024. However, in an embedded sensing display panel 10 (such as an embedded touch display panel), the common electrodes are divided into multiple sensing electrodes 101, and the sensing electrodes 101 are multiplexed to realize sensing and display. Therefore, in the sensing stage of the display panel 10, a plurality of sensing electrodes 101 need to receive the modulation voltage without the common voltage. Therefore, the compensation unit 2024 is not suitable for the design of the embedded sensing display panel 10.

Considering that the embedded sensing display panel 10 also has the problem that the common voltage of the multiple sensing electrodes 101 is changed by parasitic capacitive coupling due to the change of one of the data signal and the scanning signal in the corresponding display stage, the embedded sensing display panel 10 also needs to compensate for the coupling influence of the common voltage in the corresponding display stage. The embedded sensing display panel 10 also needs to stop compensating the common voltage in the corresponding sensing stage, so that the plurality of sensing electrodes 101 can receive the modulation voltage and realize the sensing function. Therefore, the compensation unit 2024 is applied to the embedded sensing display panel 10, and the voltage selection unit 2023 is also included to use the second control unit 2021 to control the voltage selection unit 2023 to make the compensation unit 2024 to compensate for the coupling influence of the common voltage in the display stage and to stop compensating the common voltage in the sensing stage. In this way, the sensing function of the display panel 10 can be realized and the compensation of the coupling influence on the common voltage can be realized in the display stage.

Optionally, when the display panel 10 is used to realize the touch function, the coupling influence on the common voltage is compensated by enabling the compensation unit 2024 in the display stage, so that horizontal stripe issue could be improved.

Figure 3A:
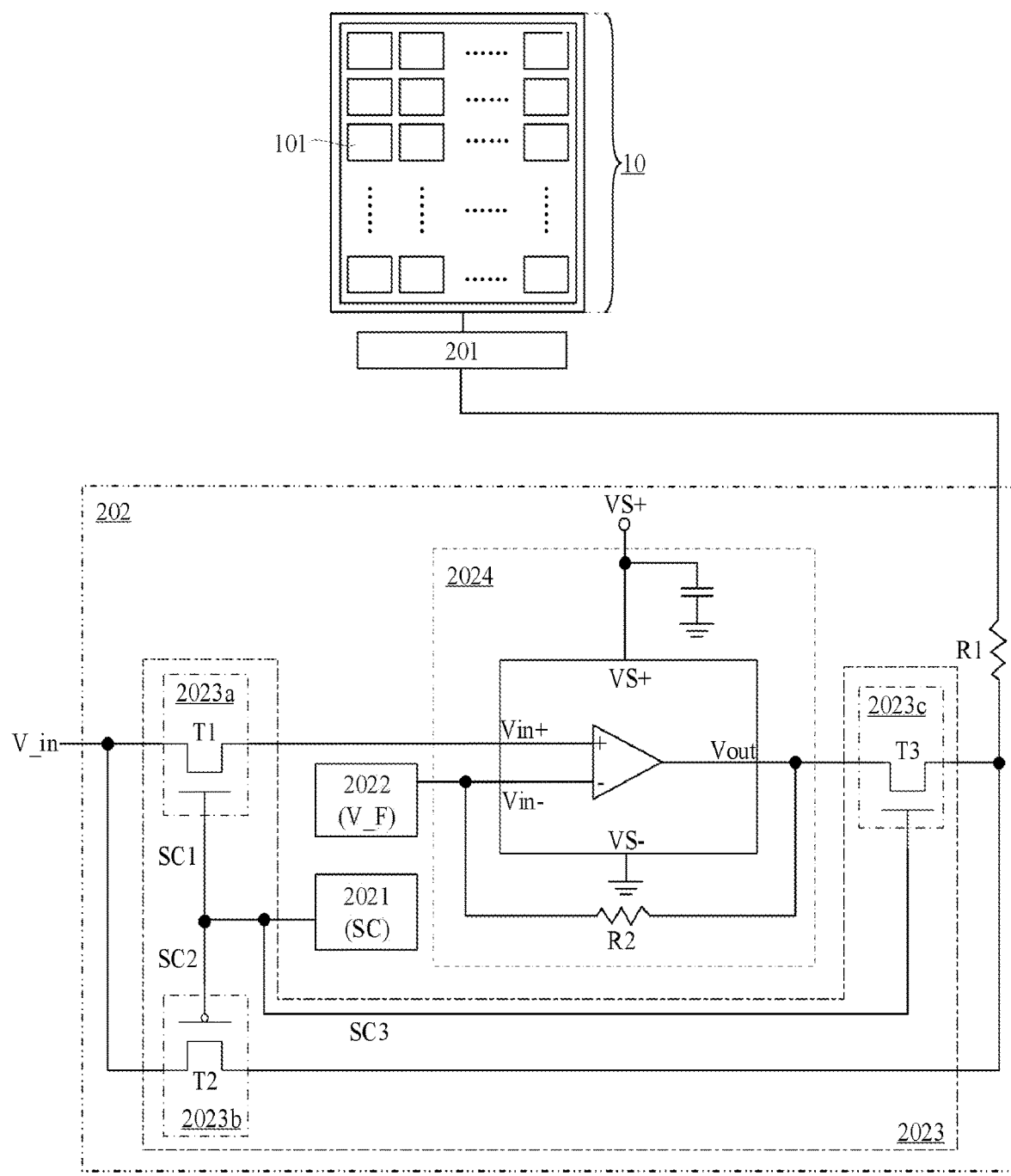
FIGS. 3A-3C are diagrams of driving circuits according to embodiments of the present disclosure.
Figure 3B:
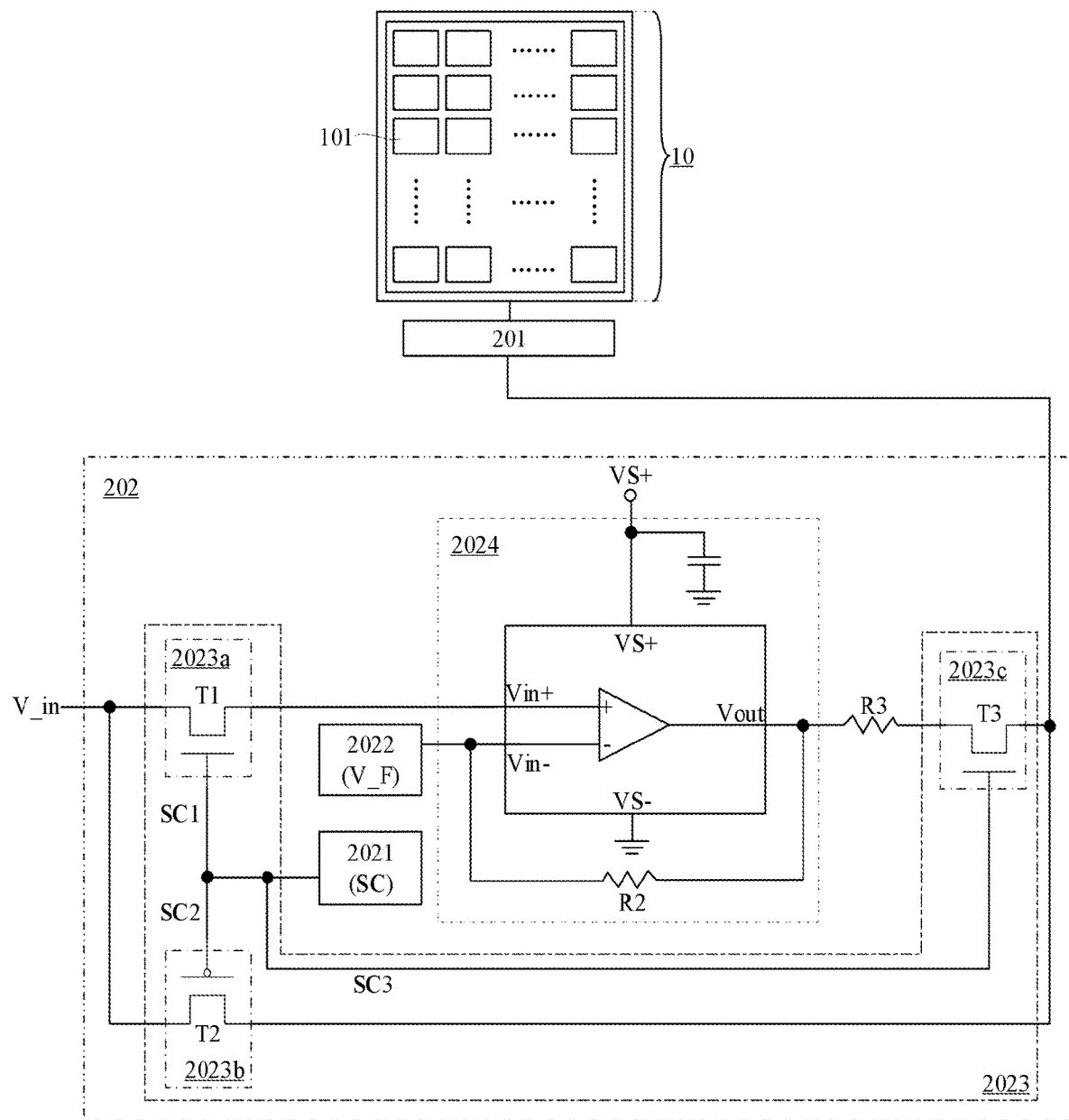
Figure 3C:
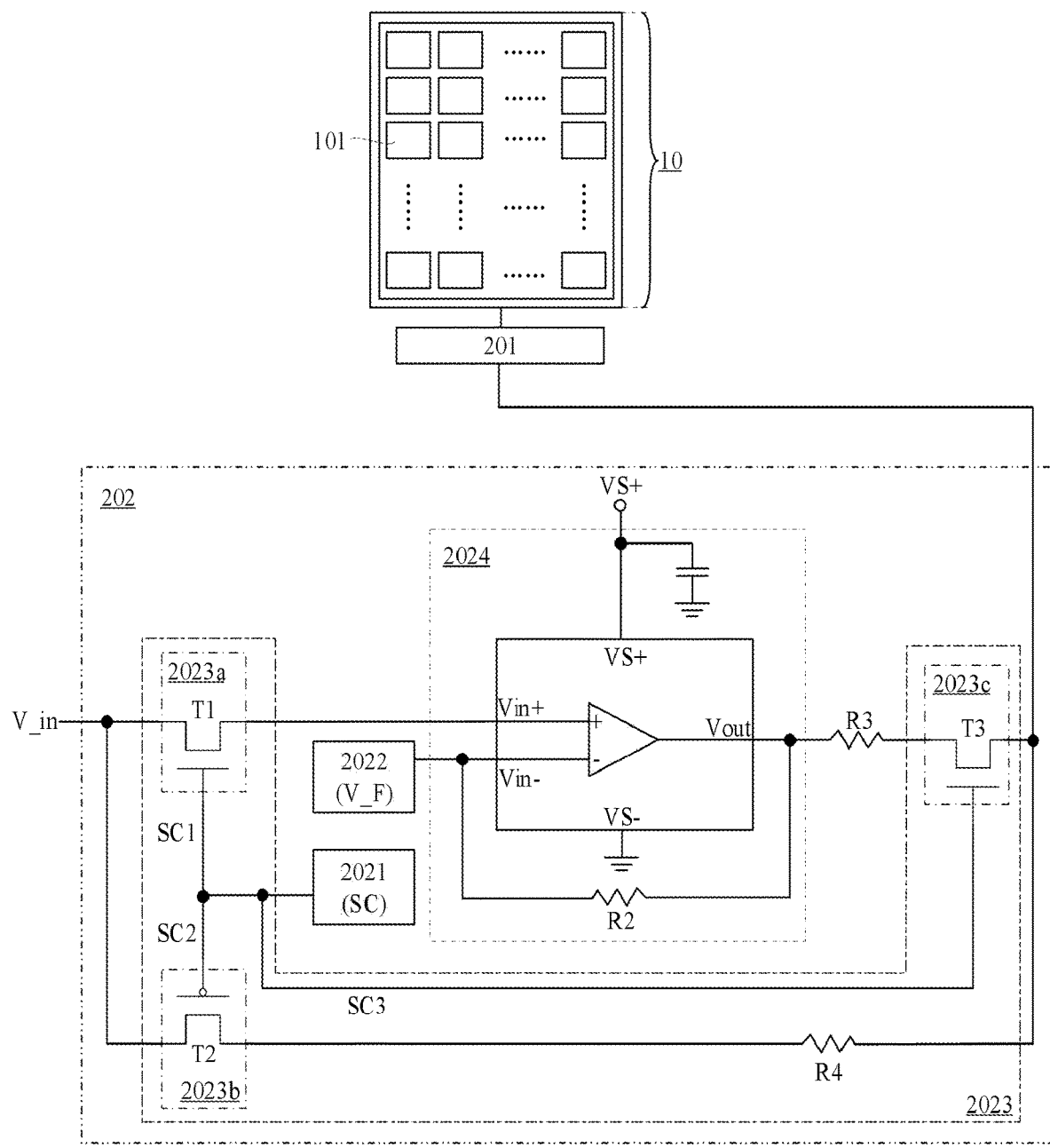

FIGS. 3A-3C are diagrams of driving circuits according to embodiments of the present disclosure. The voltage selection unit 2023 comprises a first input control module 2023a.

The first input control module 2023a is electrically connected between the second control unit 2021 and the compensation unit 2024. The first input control module 2023a is configured to electrically connect the input signal line IL to the compensation unit 2024 according to the corresponding switching control signal SC.

Optionally, the first input control module 2023a comprises a first transistor T1. The control terminal of the first transistor T1 is configured to receive the corresponding switching control signal SC, the input terminal of the first transistor T1 is electrically connected to the input signal line IL, and the output terminal of the first transistor T1 is electrically connected to the compensation unit 2024.

As shown in FIGS. 3A-3C, the voltage selection unit 2023 comprises a second input control module 2023b. The second input control module 2023b is electrically connected between the second control unit 2021 and the first control unit 201. The second input control module 2023b is configured to electrically connect the input signal line IL to the first control unit 201 according to the corresponding switching control signal SC.

Optionally, the second input control module 2023b comprises a second transistor T2. The control terminal of the second transistor T2 is configured to receive the corresponding switching control signal SC, the input terminal of the second transistor T2 is electrically connected to the input signal line IL, and the output terminal of the second transistor T2 is electrically connected to the first control unit 201.

By including the first input control module 2023a, the first input control module 2023a could input the input signal V_in to the compensation unit 2024 during the display stage. By including the first input control module 2023a and the second input control module 2023b, the input signal line IL can be electrically connected to the first control unit 201 through different circuit paths in the display stage and the sensing stage.

Although the compensation control unit 202 can control the input signal through the first input control module 2023a V_in so that the input signal V_in is not output to the compensation unit 2024 during the sensing stag. However, it cannot control the compensation unit 2024 not to output a signal during the sensing stage that might affect the normal output of the second voltage signal. Therefore, in order to avoid the compensation unit 2024 from influencing the normal output of the compensation control unit 202 during the sensing stage, the voltage selection unit 2023 comprises an output control module 2023c.

Please refer to FIGS. 3A-3C. The output control module 2023c is electrically connected to the first control unit 201, the compensation unit 2024 and the second control unit 2021. The output control module 2023c is configured to electrically connect the output terminal of the compensation unit 2024 to the first control unit 201 according to the corresponding switching control signal SC when the input signal line IL and the first input terminal of the compensation unit 2024 are electrically connected. Correspondingly, when the input signal line IL and the first input terminal of the compensation unit 2024 are no longer electrically connected (i.e., corresponding to the sensing stage), the output control module 2023c is configured to break the electrical connection between the output terminal of the compensation unit 2024 and the first control unit 201 according to the corresponding switching control signal SC.

Optionally, the output control module 2023c comprises a third transistor T3. The control terminal of the third transistor T3 is configured to receive the corresponding switching control signal SC, the input terminal of the third transistor T3 is electrically connected with the output terminal of the compensation unit 2024, and the output terminal of the third transistor T3 is electrically connected to the first control unit 201.

Optionally, the first input control module 2023a, the second input control module 2023b and the output control module 2023c can be controlled by different switching control signals SC.

The second control unit 2021 is configured to generate a plurality of switching control signal SCs. The switching control signal SCs comprise a first switching control signal SC1, a second switching control signal SC2 and a third switching control signal SC3. the first input control module 2023a is controlled by the first switching control signal SC1, the second input control module 2023b is controlled by the second switching control signal SC2, and the output control module 2023c is controlled by the third switching control signal SC3.

Optionally, the control terminal of the first transistor T1 is configured to receive the first switching control signal SC1, and the first transistor T1 is configured to be turned on or off according to the first switching control signal SC1. The control terminal of the second transistor T2 is configured to receive the second switching control signal SC2, and the second transistor T2 is configured to be turned on or off according to the second switching control signal SC2. The control terminal of the third transistor T3 is configured to receive the third switching control signal SC3, and the third transistor T3 is configured to be turned on or off according to the third switching control signal SC3.

Optionally, the first input control module 2023a and the second input control module 2023b can be controlled by the same switching control signal SC, so as to reduce the control complexity of the second control unit 2021 to the voltage selection unit 2023, reduce the power consumption of the second control unit 2021 while reducing the number of switching control signal SCs used in the voltage selection unit 2023.

The first input control module 2023a and the second input control module 2023b can be controlled by the same switching control signal SC, so as to reduce the control complexity of the second control unit 2021 to the voltage selection unit 2023. This could reduce the power consumption of the second control unit 2021 while reducing the number of switching control signals SC used in the voltage selection unit 2023.

Optionally, the first switching control signal SC1 is the same as the second switching control signal SC2 (i.e., the second control unit 2021 only needs to generate one of the first switching control signal SC1 and the second switch signal SC2). The first transistor T1 is one of the P-type transistors or N-type transistors, and the second transistor T2 is a P-type transistor or N-type transistor.

When the compensation unit 2024 is electrically connected to the input signal line IL, the compensation unit 2024 also needs to be electrically connected to the first control unit 201 so that the first voltage signal can be transmitted to the first control unit 201. When the compensation unit 2024 is not electrically connected to the input signal line IL, the compensation unit 2024 is also not electrically connected with the first control unit 201. Therefore, the working states of the first input control module 2023a and the output control module 2023c are synchronized. Therefore, the first input control module 2023a and the output control module 2023c can also be controlled by the same switching control signal SC, so as to reduce the control complexity of the second control unit 2021 to the voltage selection unit 2023 and reduce the power consumption of the second control unit 2021.

Correspondingly, the first switching control signal SC1 and the third switching control signal SC3 are the same, the first transistor T1 and the third transistor T3 are both P-type transistors, or the first transistor T1 and the third transistor T3 are both N-type transistors.

The first input control module 2023a, the second input control module 2023b and the output control module 2023c can be controlled by the same switching control signal SC, so that the control of the voltage selection unit 2023 can be realized by utilizing a switching control signal SC, so as to further reduce the control complexity of the second control unit 2021 to the voltage selection unit 2023 and reduce the power consumption of the second control unit 2021.

Correspondingly, the first switching control signal SC1 and the second switching control signal SC2 are identical, the first switching control signal SC1 and the third switching control signal SC3 are the same, the first transistor T1 and the third transistor T3 are one of a P-type transistor or an N-type transistor, and the second transistor T2 is the other of the P-type transistor and the N-type transistors.

Please refer to FIGS. 3A-3C. The compensation unit 2024 includes an operating circuit and a second resistor R2. The non-inverting input terminal of the operating circuit is electrically connected to the output terminal of the first transistor T1, the inverting input terminal of the operating circuit is configured to receive the feedback signal V_F, and the output terminal of the operating circuit is electrically connected to the input terminal of the third transistor T3. The output terminal of the operating circuit and the inverting input terminal of the operation circuit are electrically connected. The first terminal of the second resistor R2 is electrically connected to the inverting input terminal of the operating circuit, and the second terminal of the second resistance R2 is electrically connected to the output terminal of the operation circuit.

The driving circuit 20 adjusts the signal output at the output terminal of the operating circuit by making the operation circuit receive the feedback signal V_F, such that the first voltage signal comprises the coupling information of the common voltage. The working principle of the compensation unit 2024 can be obtained according to the related art and is omitted here. The compensation unit 2024 can be applied to the topology in the related art.

Please refer to FIG. 3A. Optionally, the driving circuit 20 of the display panel 10 further comprises a first resistor R1. The first terminal of the first resistor R1 is electrically connected to the output terminal of the second transistor T2 and the output terminal of the third transistor T3. The second terminal of the first resistor R1 is electrically connected to the first control unit 201. The first resistor R1 is used to limit the current and improve the anti-interference ability.

Optionally, the resistance value of the first resistor R1 can be greater than or equal to 0.1Ω~10Ω, so as to avoid the divided voltage across the first resistor R1 being too great due to the great resistance value of the first resistance R1. If the voltage across the first resistor R1 is too great, the normal operation of the driving circuit 20 will be affected.

According to the size and manufacturing process of the display panel 10 where the driving circuit 20 is used, the resistance value of the first resistor R1 can be different. Therefore, the resistance value of the first resistor R1 can also be set according to the actual implementations.

Optionally, please refer to FIG. 3B. Optionally, the driving circuit 20 of the display panel 10 further comprises a third resistor R3. The first terminal of the third resistor R3 is electrically connected to the output terminal of the operating circuit, and the second terminal of the third resistor R3 is electrically connected to the input terminal of the third transistor T3. The third resistor R3 is used to limit the current to the current path from the compensation unit 2024 to the first control unit 201, so as to prevent the voltage level corresponding to the first voltage signal from being too high. In this way, when the first voltage signal is transmitted to the first control unit 201, the first control unit 201 will not be subjected to a higher voltage or an impact of a larger current such that the lifetime of the first control unit 201 is ruined.

Please refer to FIG. 3C. Optionally, the driving circuit 20 of the display panel 10 further comprises a fourth resistor R4. The first terminal of the fourth resistor R4 is electrically connected to the output terminal of the second transistor T2, and the second terminal of the fourth resistor R4 is electrically connected to the first control unit 201. The fourth resistor R4 is used to limit the current to the current path from the input signal line IL to the first control unit 201 to improve the stability of the circuit.

In some embodiments, the driving circuit 20 may only comprise the fourth resistor R4 without the third resistor R3. The driving circuit 20 may comprise all of the first resistor R1 to the fourth resistor R4. That is, the driving circuit 20 can include at least one of the first resistor R1 to the fourth resistor R4 to improve the stability of the driving circuit 20.

Optionally, the first voltage signal can be directly output to the plurality of sensing electrodes 101 without passing through the first control unit 201, so as to reduce the delay and loss of the first voltage signal on the transmission path when the first voltage signal is output to the plurality of sensing electrodes 101 through the first control unit 201.

Optionally, the first control unit 201 may also generate the common voltage or the modulation voltage according to the AC and DC state of the signal output by the compensation control unit 202.

Optionally, the first control unit 201 may also be configured to receive the feedback signal V_F to generate the common voltage according to the feedback signal V_F and the first voltage signal in the display stage.

Figure 4:
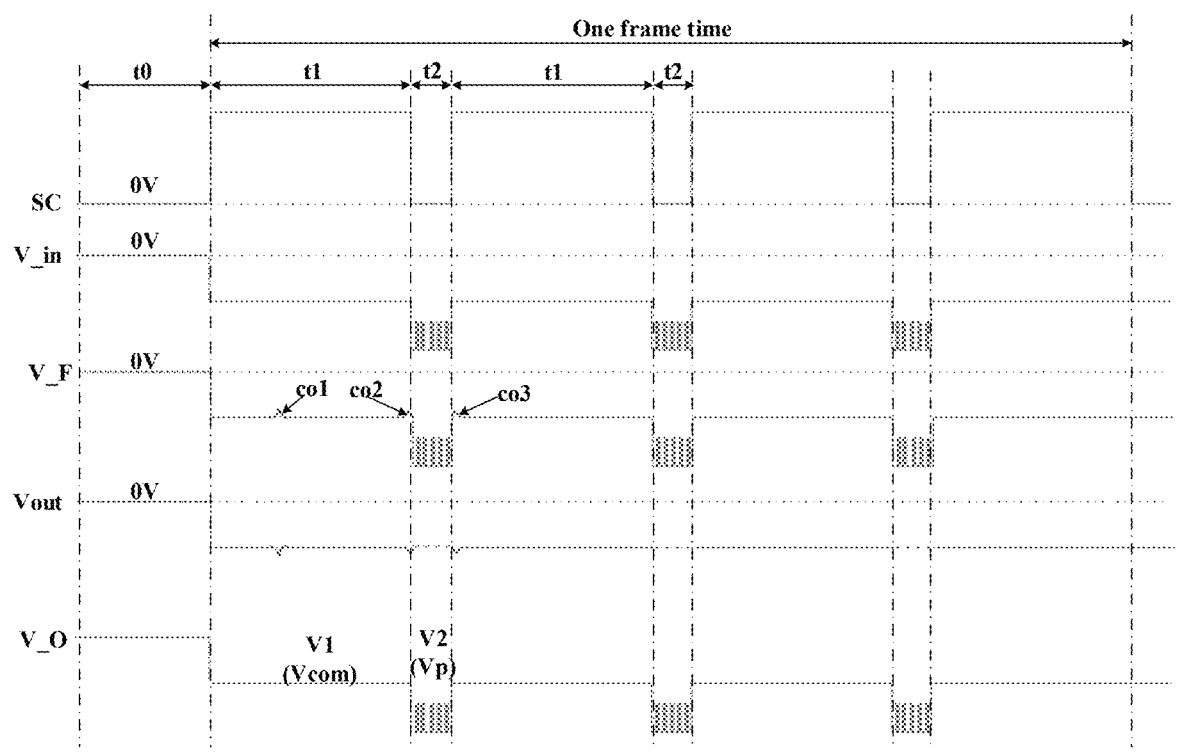
FIG. 4 is the timing diagram of the driving circuit of the display panel according to an embodiment of the present disclosure.

FIG. 4 is the timing diagram of the driving circuit of the display panel according to an embodiment of the present disclosure. Vout indicates the signal output at the output terminal of the compensation unit 2024. V_O represents the signal output by the compensation control unit 202 to the first control unit 201. In the display stage t1, the signal V_O output by the compensation control unit 202 to the first control unit 201 corresponds to the first voltage signal V1. In the sensing stage t2, the signal V_O output by the compensation control unit 202 to the first control unit 201 corresponds to the second voltage signal V2. The V_O may also represent a signal output from the first control unit 201 to the plurality of sensing electrodes 101. In the display stage t1, the signal V_O that the first control unit 201 outputs to the plurality of sensing electrodes 101 corresponds to the common voltage Vcom. In the sensing stage t2, the signal V_O that the first control unit 201 outputs to the plurality of sensing electrodes 101 corresponds to the modulation voltage Vp. The voltage value corresponding to the first voltage signal V1 and the voltage value corresponding to the common voltage Vcom can be different or the same. The voltage value corresponding to the second voltage signal V2 and the voltage corresponding to the modulation voltage Vp can be different or the same.

Optionally, in the display stage t1, the input signal V_in is a DC signal, so that the common voltage Vcom output by the first control unit 201 is correspondingly a DC signal. In the sensing stage t2, the input signal is V_in is an AC signal, so that the modulation voltage Vp output by the first control unit 201 is correspondingly an AC signal.

Optionally, because the compensation control unit 202 can control the first voltage signal V1 and the second voltage signal V2 to be output to the first control unit 201 in a time-sharing manner according to the voltage selection unit 2023, the first voltage signal V1 and the second voltage signal V2 can be transmitted to the first control unit 201 through the same signal transmission line, so as to reduce the number of signal lines of the transmission signal and save the layout space.

Please refer to FIGS. 3A-3C and FIG. 4. In this embodiment, the first transistor T1 and the third transistor T3 are N-type transistors, and the second transistor T2 is a P-type transistor. The control terminals of the first transistor T1 to the third transistor T3 receive the same switching control signal SC. Please note, this configuration should be taken as an example, not a limitation of the present disclosure. The working principle of the driving circuit 20 of the display panel 10 is explained as below:

In the display stage t1: the switching control signal SC output by the second control unit 2021 is in a high voltage level, and the input signal V_in is a DC signal.

The first transistor T1 and the third transistor T3 are turned on, and the second transistor T2 is turned off. The feedback signal V_F real-time reflects the coupling condition of the common voltage Vcom in the display panel 10 (as shown in FIG. 4, co1-co3 correspond to the coupling influences), and the compensation unit 2024 outputs the signal Vout according to the feedback signal V_F and the input signal V_in. The first control unit 201 correspondingly outputs the common voltage Vcom to the plurality of sensing electrodes 101, so as to compensate for the common voltage Vcom of the display panel 10. Here, co1 in FIG. 4 is mainly the coupling influence caused by the switching polarity of the data signal, and co2-co3 corresponds to timings right before and after the sensing operation and represent the coupling influences caused by the change of the data signal.

In the sensing stage t2: the switching control signal SC output by the second control unit 2021 is in a low voltage level, and the input signal V_in is an AC signal.

The first transistor T1 and the third transistor T3 are turned off, and the second transistor T2 is turned on. The input signal V_in is output to the first control unit 201 through the second transistor T2, and the first control unit 201 outputs a modulation voltage Vp to the plurality of sensing electrodes 101.

The output signal of the compensation unit 2024 corresponds to the dashed line of the sensing stage t2 to represent the virtual output state.

The switching control signal SC is generated through the second control unit 2021, so that the voltage selection unit 2023 could enable the compensation unit 2024 in the display stage t1 and disable the compensation unit 2024 in the sensing stage t2 according to the switching control signal SC. This realizes the enabling control of the compensation unit 2024. In this way, the common voltage Vcom can be compensated in the display stage t1, so that the touch design of the display panel is realized while the horizontal stripe issue is improved.

In this embodiment, an initial stage t0 may be further included before the display stage t1. In the initial stage t0, the voltage level of the switching control signal SC, the input signal V_in, and the signals output by the compensation unit 2024, the compensation control unit 202 and the first control unit 201 is 0V.

One frame time of the display panel 10 could include at least one display stage t1 and one sensing stage t2.

The sensing stage t2 can correspond to a blanking interval, so as to reduce the influence of the addition of the sensing stage t2 on the duration of the display stage t1, so that the display panel 10 can have a better display quality.

The display stage t1 can correspond to the scan time of at least one row of sub-pixel. That is, after the display panel 10 display a row of sub-pixels, the display panel 10 can be controlled to enter the sensing stage t2. The display panel 10 may also be controlled to enter the sensing stage t2 after multiple rows of sub-pixels are displayed.

Figure 5:
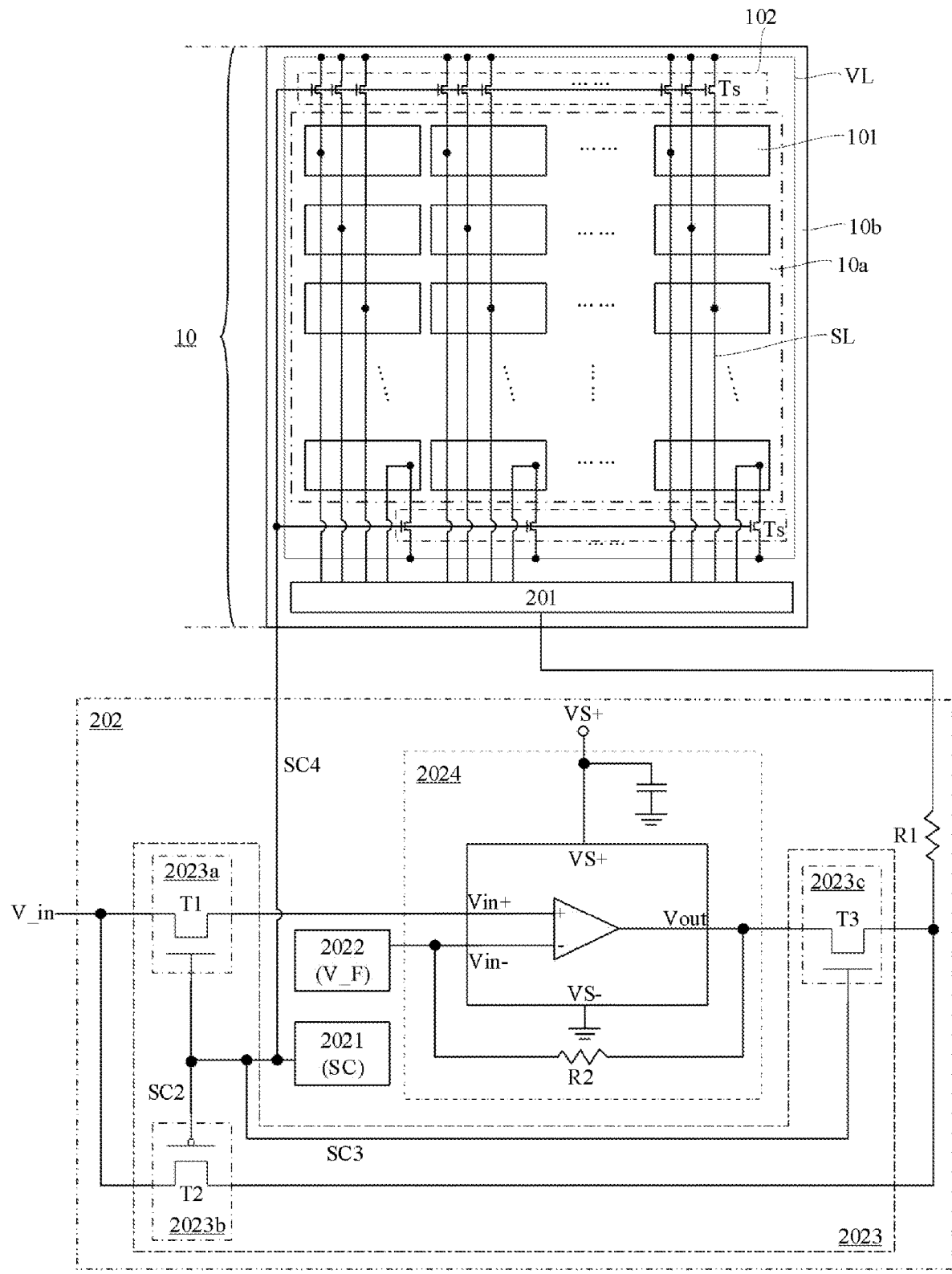
FIG. 5 is a diagram of a display device according to an embodiment of the present disclosure.

FIG. 5 is a diagram of a display device according to an embodiment of the present disclosure. As shown in FIG. 5, a display device is disclosed. The display device comprises a driving circuit 20 of any of the above-mentioned embodiments and a display panel 10.

Optionally, the display panel 10 comprises a liquid crystal display panel or the like.

Optionally, the display panel 10 comprises a plurality of sensing electrodes 101, and the plurality of sensing electrodes 101 are electrically connected to the first control unit 201.

Optionally, the display panel 10 comprises a plurality of sensing lines SL, and each sensing line SL is electrically connected between a sensing electrode 101 and the first control unit 201.

In order to make the plurality of sensing electrodes 101 have the same voltage level in the display stage and are independent of each other in the sensing stage, the display panel 10 further comprises a common wiring VL and a switching unit 102.

The switching unit 102 is electrically connected to the plurality of sensing electrodes 101, the common wiring VL and a second control unit 2021. Here, in the display stage, the switching unit 102 is configured to electrically connect the plurality of sensing electrodes 101 to the common wiring VL according to the corresponding switching control signal SC. In the sensing stage, the switching unit 102 is configured to break the electrical connection between the plurality of sensing electrodes 101 and the common wiring VL according to the corresponding switching control signal SC.

Because the display panel 10 comprises the switching unit 102, when the compensation unit 2024 is enabled in the display stage, the plurality of sensing electrodes 101 are all electrically connected to the common wiring VL, so that the sensing electrodes 101 have the same voltage level when receiving the common voltage. In the sensing stage, the switching unit breaks the electrical connection between the plurality of sensing electrodes 101 and the common wiring VL, so that the plurality of sensing electrodes 101 are independent of each other. In this way, the plurality of sensing electrodes 101 can correspondingly receive the modulation voltage output by the first control unit 201.

Optionally, the switching unit comprises a plurality of switching transistors Ts. The input terminal of each switching transistor Ts is electrically connected to the common wiring VL, the output terminal of each switching transistor Ts is electrically connected to the corresponding first sensing electrode 101, and the control terminal of each switching transistors Ts is electrically connected to the second control unit 2021. Accordingly, the switching transistors Ts are controlled by the switching control signal SC generated by the second control unit 2021.

In order to synchronize the operations of the plurality of switching transistors Ts so that the sensing electrodes 101 can be synchronously electrically connected to the common wiring VL in the display stage and synchronously disconnected to the common wiring VL during the sensing stage, the control terminals of the plurality of switching transistors Ts are configured to receive the switching control signal SC.

Optionally, the switching control signal SC generated by the second control unit 2021 comprises a fourth switching control signal SC4, and the control terminals of the plurality of switching transistors Ts are configured to receive the fourth switching control signal SC4. The switching transistors Ts are configured to be turned on according to the fourth switching control signal SC4 during the display stage, and the switching transistors Ts are configured to be turned off according to the fourth switching control signal SC4 during the sensing stage.

Optionally, the type of the majority carriers of each switching transistor Ts is the same as that of the first transistor T1 (i.e., the switching transistor Ts and the first transistor T1 are both N-type transistors or both P-type transistors), and the first switching control terminals are configured to receive the first switching control signal SC1 so as to reduce the number of switching control signals SC applied to the display panel 10.

Optionally, the first transistor T1, the third transistor T3, and the plurality of switching transistors Ts have the same type of majority carriers, and the type of the majority carriers of the first transistor T1 is the opposite of the type of the majority carriers of the second transistor T2 (i.e., the first transistor T1 is one of the N-type transistor and the P-type transistor, and the second transistor T2 is the other of the N-type transistors and the P-type transistor). The first transistor T1, the second transistor T2, the third transistor T3 and the plurality of switching transistors Ts are controlled by the same switching control signal SC, so that the working state of these transistors is controlled by utilizing only one switching control signal SC. This could reduce the number of switching control signals SC of the display panel 10, reduce the power consumption of the second control unit 2021, and improve the cooperative matching degree of the plurality of transistors.

Optionally, the plurality of switching transistors Ts may be arranged at the first terminal of the display panel 10 and the second terminal opposite to the first terminal. The plurality of sub-pixels of the display panel 10 are arranged between the first terminal and the second terminal, so that the plurality of switching transistors Ts do not occupy the layout space of the sub-pixels. This could ensure that the sub-pixels have a better aperture rate, and the display panel 10 could have a better resolution. Optionally, the first terminal may correspond to the top of the display area of the display panel 10, and the second terminal may correspond to the bottom of the display area.

Optionally, the plurality of switching transistors Ts may be located in the display area 10a or in the non-display area 10b of the display panel 10. In an embodiment, the plurality of switching transistors Ts are positioned in the non-display area 10b, so that the plurality of switching transistors Ts do not occupy the layout area of the display area 10b. In this way, the display panel 10 has a better display taste. In an embodiment, the plurality of switching transistors Ts are located in the upper and lower side frame areas.

Optionally, the common wiring VL can be located in the non-display area 10b of the display panel 10. The common wiring VL can be arranged around the display area 10a of the display panel 10, so that the plurality of switching transistors Ts located at the first terminal and the second terminal can be electrically connected to the common wiring VL in a shorter connection path, so that the wiring space is reduced.

According to an embodiment of the present disclosure, the driving circuit 20 of the display panel 10 and the display device could compensate the common voltage by enabling the compensation unit 2024 in the display stage, so that the voltage coupling influences before and after the touch operation could be quickly recovered, thereby improving the horizontal stripe issues and the display quality of the display panel 10 and improving the use experience of terminal customers.

The display device comprises a mobile phone, a computer, a television, a bracelet or the like.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A driving circuit of a display panel, the display panel comprising a plurality of sensing electrodes, and the driving circuit comprising:
   a first control unit, electrically connected to the plurality of sensing electrodes, configured to output a common voltage or a modulation voltage to the plurality of sensing electrodes; and
   a compensation control unit, electrically connected to an input signal line and the first control unit;
   wherein in a display stage of the display panel, the compensation control unit is configured to generate a first voltage signal according to a feedback signal and an input signal transmitted by the input signal line, and the first control unit is configured to output the common voltage according to the first voltage signal, wherein the feedback signal is configured to indicate a coupling change of the common voltage of the plurality of sensing electrodes, such that common voltage coupling information contained in the feedback signal causes the first voltage signal to include the common voltage coupling information; and in a sensing stage of the display panel, the compensation control unit is configured to generate a second voltage signal according to the input signal, and the first control unit is configured to output the modulation voltage according to the second voltage signal,
   wherein the compensation control unit comprises:
   a second control unit, configured to generate at least one switching control signal;
   a voltage selection unit, electrically connecting the input signal line, the first control unit and the second control unit; and
   a compensation unit, electrically connected to the voltage selection unit, wherein the compensation unit is further configured to receive the feedback signal;
   wherein in the display stage, the voltage selection unit is configured to control the compensation unit according to the corresponding switching control signal to generate the first voltage signal according to the input signal and the feedback signal to output the first voltage signal to the first control unit; and in the sensing stage, the voltage selection unit is configured to generate the second voltage signal according to the corresponding switching control signal and the input signal to output the second voltage signal to the first control unit.

2. The driving circuit of claim 1, wherein the voltage selection unit comprises:
a first input control module, electrically connected between the second control unit and the compensation unit, configured to electrically connect the input signal line and the compensation unit according to the corresponding switching control signal;
a second input control module, electrically connected between the second control unit and the first control unit, configured to electrically connect the input signal line and the first control unit according to the corresponding switching control signal; and
an output control module, electrically connected to the first control unit, the compensation unit and the second control unit, configured to electrically connect an output terminal of the compensation unit and the first control unit according to the corresponding switching control signal when the input signal line and a first input terminal of the compensation unit are electrically connected.

3. The driving circuit of claim 2, wherein the switching control signal comprises a first switching control signal, a second switching control signal and a third switching control signal;
the first input control module comprises a first transistor, a control terminal of the first transistor is configured to receive the first switching control signal, an input terminal of the first transistor is electrically connected to the input signal line, and an output terminal of the first transistor is electrically connected with the compensation unit;
the second input control module comprises a second transistor, a control terminal of the second transistor is configured to receive the second switching control signal, an input terminal of the second transistor is electrically connected with the input signal line, and an output terminal of the second transistor is electrically connected with the first control unit; and
the output control module comprises a third transistor, a control terminal of the third transistor is configured to receive the third switching control signal, an input terminal of the third transistor is electrically connected with the output terminal of the compensation unit, and an output terminal of the third transistor is electrically connected with the first control unit.

4. The driving circuit of claim 3, wherein the first switching control signal is identical to the second switching control signal, the first switching control signal is identical to the third switching control signal are identical, the first transistor and the third transistor are one of a P-type transistor and an N-type transistor, and the second transistor is the other of the P-type transistors and the N-type transistor.

5. The driving circuit of claim 3, further comprising:
a first resistor;
wherein a first terminal of the first resistor is electrically connected with the output terminal of the second transistor and the output terminal of the third transistor, and a second terminal of the first resistor is electrically connected to the first control unit.

6. The driving circuit of claim 3, wherein the compensation unit comprises:

an operating circuit, having a non-inverting input terminal electrically connected to the output terminal of the first transistor; an inverting input terminal electrically connected to the input terminal of the third transistor and configured to receive the feedback signal; and an output terminal electrically connected to the inverting input terminal; and
the second resistor, electrically connected between the inverting input terminal and the output terminal of the operating circuit.

7. The driving circuit of claim 1, wherein the input signal is a DC signal in the display stage; and the input signal is an alternating current signal in the sensing stage.

8. A display device, comprising:
a display panel, comprising a plurality of sensing electrodes, a common wiring and a switching unit electrically connected to the plurality of sensing electrodes, and the common wiring; and
a driving circuit, comprising:
a first control unit, electrically connected to the plurality of sensing electrodes, configured to output a common voltage or a modulation voltage to the plurality of sensing electrodes; and
a compensation control unit, electrically connected to an input signal line and the first control unit;
wherein in a display stage, the compensation control unit is configured to generate a first voltage signal according to a feedback signal and an input signal transmitted by the input signal line, the first control unit is configured to output the common voltage according to the first voltage signal, the switching unit is configured to electrically connect the plurality of sensing electrodes and the common wiring according to the corresponding switching control signal, wherein the feedback signal is configured to indicate a coupling change of the common voltage of the plurality of sensing electrodes, such that common voltage coupling information contained in the feedback signal causes the first voltage signal to include the common voltage coupling information;
wherein in a sensing stage, the switching unit is configured to break the electrical connection between the plurality of sensing electrodes and the common wiring according to the corresponding switching control signal, the compensation control unit is configured to generate a second voltage signal according to the input signal, and the first control unit is configured to output the modulation voltage according to the second voltage signal,
wherein the compensation control unit comprises:
a second control unit, configured to generate at least one switching control signal;
a voltage selection unit, electrically connecting the input signal line, the first control unit and the second control unit;
a compensation unit, electrically connected to the voltage selection unit, wherein the compensation unit is further configured to receive the feedback signal;
wherein in the display stage, the voltage selection unit is configured to control the compensation unit according to the corresponding switching control signal to generate the first voltage signal according to the input signal and the feedback signal to output the first voltage signal to the first control unit; and in the sensing stage, the voltage selection unit is configured to generate the second voltage signal according to the corresponding switching control signal and the input signal to output the second voltage signal to the first control unit.

9. The display device of claim 8, wherein the switching unit comprises:
a plurality of switching transistors, wherein an input terminal of each switching transistor is electrically connected to the common wiring, an output terminal of each switching transistor is electrically connected to a corresponding sensing electrode, and a control terminal of each switching transistor is electrically connected to the second control unit;
wherein the control terminals of the plurality of switching transistors are configured to receive the switching control signal.

10. The display device of claim 8, wherein the voltage selection unit comprises:
a first input control module, electrically connected between the second control unit and the compensation unit, configured to electrically connect the input signal line and the compensation unit according to the corresponding switching control signal;
a second input control module, electrically connected between the second control unit and the first control unit, configured to electrically connect the input signal line and the first control unit according to the corresponding switching control signal; and
an output control module, electrically connected to the first control unit, the compensation unit and the second control unit, configured to electrically connect an output terminal of the compensation unit and the first control unit according to the corresponding switching control signal when the input signal line and a first input terminal of the compensation unit are electrically connected.

11. The display device of claim 10, wherein the switching control signal comprises a first switching control signal, a second switching control signal and a third switching control signal;
the first input control module comprises a first transistor, a control terminal of the first transistor is configured to receive the first switching control signal, an input terminal of the first transistor is electrically connected to the input signal line, and an output terminal of the first transistor is electrically connected with the compensation unit;
the second input control module comprises a second transistor, a control terminal of the second transistor is configured to receive the second switching control signal, an input terminal of the second transistor is electrically connected with the input signal line, and an output terminal of the second transistor is electrically connected with the first control unit; and
the output control module comprises a third transistor, a control terminal of the third transistor is configured to receive the third switching control signal, an input terminal of the third transistor is electrically connected with the output terminal of the compensation unit, and an output terminal of the third transistor is electrically connected with the first control unit.

12. The display device of claim 11, wherein the first switching control signal is identical to the second switching control signal, the first switching control signal is identical to the third switching control signal are identical, the first transistor and the third transistor are one of a P-type transistor and an N-type transistor, and the second transistor is the other of the P-type transistors and the N-type transistor.

13. The display device of claim 11, wherein the driving circuit further comprises:
a first resistor;
wherein a first terminal of the first resistor is electrically connected with the output terminal of the second transistor and the output terminal of the third transistor, and a second terminal of the first resistor is electrically connected to the first control unit.

14. The display device of claim 11, wherein the compensation unit comprises:
an operating circuit, having a non-inverting input terminal electrically connected to the output terminal of the first transistor; an inverting input terminal electrically connected to the input terminal of the third transistor and configured to receive the feedback signal; and an output terminal electrically connected to the inverting input terminal; and
the second resistor, electrically connected between the inverting input terminal and the output terminal of the operating circuit.

15. The display device of claim 8, wherein the input signal is a DC signal in the display stage; and the input signal is an alternating current signal in the sensing stage.

* * * * *